United States Patent [19]

Dittbrenner

[11] Patent Number: 5,003,820
[45] Date of Patent: Apr. 2, 1991

[54] ELECTRONIC SPEEDOMETER FOR SNOW SKIS

[76] Inventor: Eric Dittbrenner, 2203 Hastings Dr. #23, Belmont, Calif. 94002

[21] Appl. No.: 527,934

[22] Filed: May 24, 1990

[51] Int. Cl.⁵ .......................... G01C 21/10; G01F 1/68
[52] U.S. Cl. .................................. 73/181; 73/204.24; 73/493; 73/497
[58] Field of Search ................. 73/181, 189, 493, 497, 73/204.11, 204.19, 204.27, 204.25, 204.26, 204.22, 204.24

[56] References Cited

U.S. PATENT DOCUMENTS

| 3,505,878 | 4/1970 | Moll | 73/490 |
| 4,352,063 | 9/1982 | Jones | 324/171 |
| 4,546,650 | 10/1985 | Cameron | 73/490 |
| 4,694,694 | 9/1987 | Vlakancie | 73/386 |
| 4,860,585 | 8/1989 | Tuyn et al. | 73/490 |
| 4,867,860 | 9/1989 | Manseth | 73/490 |
| 4,911,005 | 3/1990 | Heyn | 73/187 |

Primary Examiner—Donald O. Woodiel

[57] ABSTRACT

The electronic speedometer of this invention accurately calculates and digitally displays a skier's instantaneous speed. The device accomplishes this task by employing the "hot wire" principle using a thermistor and a thermocouple which are exposed to air stream through which the skis move. The device does not contain any moving parts and does not contact the snow or rely on snow contact for its operation. Since the construction of the device minimizes drag, its effect on a skier's performance is negligible. The device can easily be mounted and removed from a ski without the use of tools and without damaging the ski, thereby making it easily transferable to other surfaces, such as snowboards and hangliders.

15 Claims, 1 Drawing Sheet

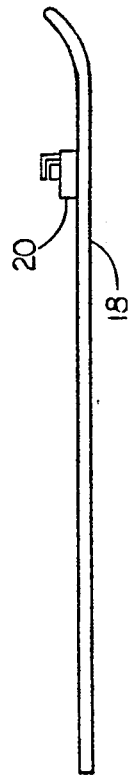
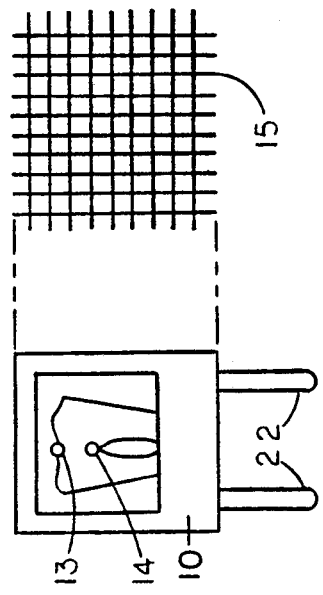
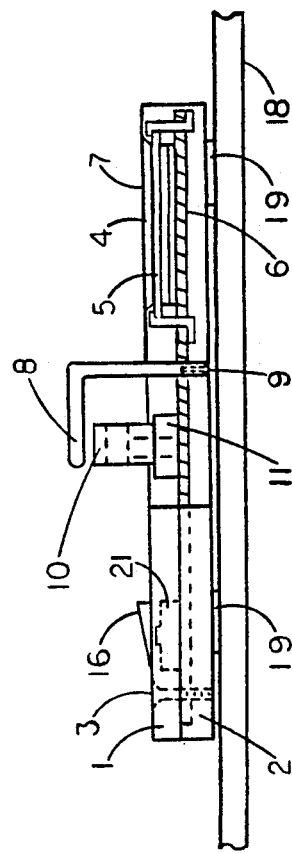
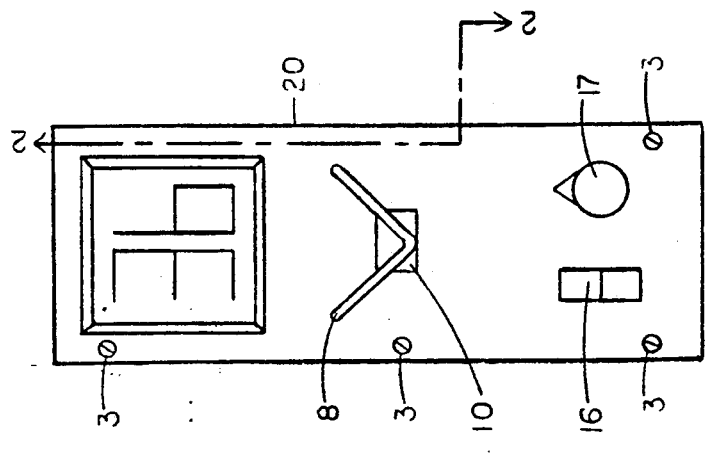
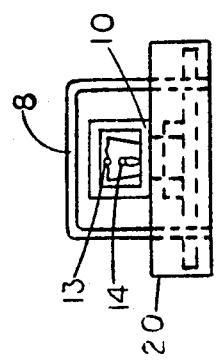

ELECTRONIC SPEEDOMETER FOR SNOW SKIS

BACKGROUND OF THE INVENTION

This invention relates to an electronic speedometer. More particularly, the invention relates to a device which, when placed on a ski, will measure the speed of the ski or skier moving through the air.

DESCRIPTION OF PRIOR ART

The present invention is believed to be found in the general Class 73 entitled, "Measurement and Testing", and more specifically in Subclass 204. While certain prior art describes what is referred to as "hot wire" technology, such technology has not been applied to a ski for the purposes of measuring its speed.

On the other hand, some patents disclose different technologies that have been applied to skis. For example, U.S. Pat. Nos. 3,505,878, 4,262,537, 4,546,650 and 4,694,694, describe various means for detecting speed of a skier.

U.S. Pat. No. 4,546,650 to Cameron describes a microcomputer that calculates speed and distance of the skier. The device is mounted on the rear portion of the ski, behind the skier, and is designed to be read when the skier comes to to a complete stop, at which time the skier, using his pole, pushes the appropriate buttons on the device to read performance parameters such as his distance traveled, his top speed and his average speed. The disadvantage of such a device is that the skier reads the values "after the fact" or after he has completed his ski run. The skier really does not know at which point he attained his maximum speed. Another disadvantage of Cameron's design is the use of a toothed wheel which must stay in contact with the snow to take any of its readings. Any time a skier loses contact with the snow, as in jumping or sometimes in turning, the wheel has no medium to cause it to spin and, therefore, it will not take very accurate measurements. Also, the wheel is exposed to different obstacles encountered on ski slopes, such as rocks and tree branches, which could easily damage it.

U.S. Pat. No. 4,694,694 to Vertical Inst. Inc. discloses a device marketed under trademark "SkiMeter". This device measures several performance parameters such as altitude changes and vertical speed measurements. The unit is clipped on the skier and is also designed to be read when the skier comes to a full stop. The operation of the device is based on atmospheric pressure inputs which, through electronic circuitry, computes altitude changes and vertical speeds, i.e. the rate of vertical descent or rate of altitude loss of a skier. The disadvantage of such measurements is that the skier's downhill speed is very different from his vertical descent speed. Moreover, the device does not give an instantaneous readout of downhill speed of a skier. Thus the present invention overcomes the disadvantages of the prior art devices, as will be explained in the following.

OBJECTS OF THE INVENTION

It is the principal object of this invention to provide an improved speedometer adapted to measure the skier's speed performance while going down a slope.

Another object of the invention is to provide a device showing increased ability, especially for the beginner, to ski with more control, to turn more smoothly, and to negotiate the steepness of a run better, as indicated by his gradual increases of speed. The device would also enable the skier to instantaneously evaluate his performance over any type of terrain and slope inclination. He would be able to monitor his peak speed and relate it to which point on the slop he achieved that speed. He would also be able to evaluate which parts of a slope gave him more difficulty, as shown by the decrease of speed.

Still another object of the invention is the provision of a device which is useful to a skier in downhill speed competition, in showing him if he were able to achieve the speeds necessary on different areas of a slop to be a viable competitor.

A still further object of my invention is to provide a device adapted to be placed on the forward end of the ski in full view of the skier, with the unit's height level being well below that of the curved ski tip, thereby minimizing any drag effect in the airflow it may have.

It is still a further object of this invention to provide a means of speed indication without contacting the snow in operation and without impeding the performance of any equipment on which the device is mounted for the purposes of speed indication.

It is still a further object of this invention to provide the device with a detachable probe containing the sensing elements to allow replacement of damaged elements.

It is still a further object of this invention to provide a device with a means to compensate for erroneous readings produced by headwinds.

It is still a further object of this invention to provide a means for displaying the speed digitally.

It is still a further object of this invention to provide a means of mounting the device on any desired movable surface, which allows easy removal from that surface without damaging that surface.

These and other objects of the invention will become more fully apparent from the following description and drawings.

BRIEF SUMMARY OF THE INVENTION

In accordance with the invention described herein, there is provided a device for measuring speed between a vehicle adapted to be attached to a human foot or feet and the air through which it moves comprising of: (a) a thermistor or a suitable wire, maintained at a higher than ambient temperature and exposed to the airflow through which said vehicle moves; (b) a thermocouple exposed to said airflow through which said vehicle moves; (c) a base on which said thermistor or wire and said thermocouple are mounted; (d) means on said base for supplying electrical current to said thermistor or wire and said thermocouple; (e) means on said base for reading, combining and converting signals obtained from said thermistor or wire and said thermocouple and a means for displaying said speed digitally.

BRIEF DESCRIPTION OF THE DRAWINGS

FIG. 1 is a front view of the device according to the invention.

FIG. 2 is a fragmentary cross-sectional view of the device, mounted on a ski, taken in the planes indicated by the broken line 2—2 in FIG. 3.

FIG. 3 is a top plan view of the device.

FIG. 4 is a detailed view of the probe with sensing elements, electrical connectors and a displaced view of a protective screen.

FIG. 5 is a side view of the device itself mounted on a ski.

DETAILED DESCRIPTION OF THE INVENTION

The device of the invention works on the "hot wire" principle, but uses a precision thermistor in place of a wire mounted in the probe. The thermistor is maintained at a higher than ambient temperature and the current generated by the battery, used to maintain this temperature, is measured through a printed circuitry comprised of standard resisters, capacitors, amplifiers and various computer chips. The electronics within the device convert the reading, which varies with mass overflow, into equivalent velocity readings. The probe is fitted with a thermocouple to detect air temperature, the reading from which is used to automatically compensate the device for changes in air density with temperature.

Referring now to the drawings, the device is contained in a two-part hollow plastic housing which comprises a top half 1 and a bottom half 2 as shown in FIG. 2. The two halves of the housing are held together with screws 3 as shown in FIG. 3. The top housing half 1, FIG. 2, contains an aperature 4 which permits viewing of the digital display 5 which is attached to the circuit board 6 thereunder. FIG. 2 also shows a transparent plastic lens 7 which is part of the top half 1 of the housing which provides a protective covering for the digital display 5. A stainless steel bar 8 is mounted through both housing halves 1 and 2 with screws 9. Its function is to protect the sensing elements in the probe housing 10 from damage during a fall. The top half 1 of the housing contains an opening that allows the probe 10 to have access to the electrical receptacle 11 which is attached to the circuit board 6 thereunder.

FIG. 1 shows the probe housing 10 which contains the thermistor 13 and thermocouple 14. FIG. 4 shows a detailed view of the probe housing 10 with thermistor 13, thermocouple 14, electrical leads 22 and a protective screen 15 (shown displaced) which protects the thermistor 13 and thermocouple 14. Screen 15 is attached to housing 10 with a suitable adhesive. There is also a similar screen on the back side of housing 10 for protection thereof (not shown).

FIG. 3 shows a conventional on-off switch 16 and zeroing dial 17. The dial 17 is used to compensate the unit 20 for any appreciable headwind that the user may want to nullify.

FIG. 2 shows the unit mounted on a ski 18 with two suitable adhesive attachments 19, such as VELCRO. FIG. 2 also shows the main elements contained in the housing comprising of the printed circuit board 6, probe receptacle 11, digital display 5 and battery 21. Other support electronics such as conventional resistors, capacitors, amplifiers and computer chips are not shown in order to simplify consideration of the drawing.

The entire unit 20 is typically placed on the front portion of the ski 18 as shown in FIG. 5. Referring back to FIG. 1, the probe 10 is placed in the unit 20 so that it receives the oncoming airflow from around a ski tip. This airflow is sensed by thermistor 13 and thermocouple 14 and is converted into a velocity from the electronics in the unit 20.

SUMMARY

It will be apparent from the foregoing description that the speed indicator of the invention provides a reliable means for determining instantaneous velocity measurements. It is lightweight, economical and easy to manufacture. The unit has no moving parts to wear out and the sleek design creates a very low drag through the air. The probe itself is replaceable in case of damage and can be easily and cheaply replaced by the user. The same unit, in its preferred embodiment, can easily be adapted to other uses, such as on a snowboard, a hanglider, a bicycle and motorized vehicles such as ultralight aircraft.

An important advantage of my invention is that no part of it comes in contact with snow. Contact with the snow in any means is not necessary for its operation and since no part of it extends over the ski, it is not susceptible to damage from obstacles, such as rocks.

While the above description contains many specific elements, these should not be construed as limitations on the scope of the invention but rather as the preferred embodiment. Many other variations are possible, depending on the sport or other uses it may have.

Some of these modifications may include the device without the zero out dial. This would be useful if the device were used on a hanglider, in which case the user would need to know all headwind components.

Another modification may include elimination of the thermistor and substituting a suitable wire of sufficient gauge to withstand the heating necessary to take accurate velocity measurements.

Other modifications may include eliminating the protective bar or relocating the position of the probe somewhere on the unit.

Accordingly, the scope of the invention should not be determined by the embodiment illustrated, but by the appended claims which follow.

I claim:

1. A device for measuring speed between a vehicle adapted to be attached to a human foot or feet and the air through which said vehicle moves, said device comprising of:
   (a) a thermistor maintained at a higher than ambient temperature and exposed to the airflow through which said vehicle moves;
   (b) a thermocouple exposed to said airflow through which said vehicle moves;
   (c) a base on which said thermistor and said thermocouple are mounted;
   (d) means on said base for supplying electrical current to said thermistor and said thermocouple;
   (e) means on said base for reading, combining and converting signals obtained from said thermistor and said thermocouple to a speed reading;
   (f) and means for displaying said speed reading digitally.

2. A device according to claim 1 wherein said device measures speed between a sliding wheelless vehicle and the air through which it moves.

3. A device according to claim 1 wherein said device measures speed between a wheeled vehicle and the air through which it moves.

4. A device according to claim 1 wherein said device measures speed between a motorized vehicle adapted for flight and the air through which it moves.

5. A device according to claim 1 wherein said device measures speed between a non-motorized vehicle adapted for flight and the air through which it moves.

6. A device according to claim 1 wherein said device measures speed between a snow ski and the air through which it moves.

7. A device according to claim 1, further including a circuit mounted on said base which allows a zeroing of said speed reading to compensate for erroneous readings.

8. A device according to claim 7, further including a means to said base for controlling said circuit.

9. A device for measuring speed between a vehicle adapted to be attached to a human foot or feet and the air through which said vehicle moves, said device comprising of:
   (a) a wire of sufficient gauge and material maintained at a higher than ambient temperature and exposed to the airflow through which said vehicle moves;
   (b) a thermocouple exposed to said airflow through which said vehicle moves;
   (c) a base on which said wire and said thermocouple are mounted;
   (d) means on said base for supplying electrical current to said wire and said thermocouple;
   (e) means on said base for reading, combining, and converting signals obtained from said wire and said thermocouple to a speed reading;
   (f) and means for displaying said speed reading digitally.

10. A device according to claim 9 wherein said device measures speed between a sliding wheelless vehicle and the air through which it moves.

11. A device according to claim 9 wherein said device measures speed between a wheeled vehicle and the air through which it moves.

12. A device according to claim 9 wherein said device measures speed between a motorized vehicle adapted for flight and the air through which it moves.

13. A device according to claim 9 wherein said device measures speed between a non-motorized vehicle adapted for flight and the air through which it moves.

14. A device according to claim 9, further including a circuit mounted on said base which allows a zeroing of said speed reading to compensate for erroneous readings.

15. A device according to claim 14, further including a means to said base for controlling said circuit.

* * * * *

UNITED STATES PATENT AND TRADEMARK OFFICE
CERTIFICATE OF CORRECTION

PATENT NO. : 5,003,820

DATED : 4/2/91

INVENTOR(S) : Eric Dittbrenner

It is certified that error appears in the above-identified patent and that said Letters Patent is hereby corrected as shown below:

Col. 3, line 13, change "overflow" to --airflow--.

Signed and Sealed this

Seventeenth Day of November, 1992

Attest:

DOUGLAS B. COMER

*Attesting Officer*   *Acting Commissioner of Patents and Trademarks*